(12) United States Patent
Singh et al.

(10) Patent No.: US 9,230,241 B1
(45) Date of Patent: Jan. 5, 2016

(54) INITIATING A COMMUNICATION SESSION BASED ON AN ASSOCIATED CONTENT ITEM

(75) Inventors: Ujjwal Singh, Palo Alto, CA (US);
Brian Laird, San Francisco, CA (US);
Christopher Paul David Johnson, San Bruno, CA (US); Robert David Cleveland, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/526,274

(22) Filed: Jun. 18, 2012

Related U.S. Application Data

(60) Provisional application No. 61/497,923, filed on Jun. 16, 2011.

(51) Int. Cl.
*G06F 3/00* (2006.01)
*G06Q 10/10* (2012.01)
*G06F 3/0481* (2013.01)
*G06F 3/01* (2006.01)

(52) U.S. Cl.
CPC .............. *G06Q 10/10* (2013.01); *G06F 3/0481* (2013.01)

(58) Field of Classification Search
CPC ................ G06Q 50/01; G06F 17/3089; G06F 17/30873; G06F 17/30997
USPC .......................... 715/751, 752, 753, 757, 758
See application file for complete search history.

(56) References Cited

U.S. PATENT DOCUMENTS

| | | | |
|---|---|---|---|
| 5,357,068 A | 10/1994 | Rozier | |
| 5,375,068 A | 12/1994 | Palmer et al. | |
| 5,793,365 A | 8/1998 | Tang et al. | |
| 5,880,731 A * | 3/1999 | Liles et al. | 715/758 |
| 6,434,599 B1 | 8/2002 | Porter | |
| 7,016,935 B2 | 3/2006 | Lee et al. | |
| 7,620,902 B2 | 11/2009 | Manion et al. | |
| 7,752,553 B2 * | 7/2010 | Pennington et al. | 715/751 |
| 7,822,809 B2 | 10/2010 | Dhupelia et al. | |
| 7,865,566 B2 | 1/2011 | Ashtekar et al. | |
| 7,945,862 B2 * | 5/2011 | Aldrich et al. | 715/751 |

(Continued)

OTHER PUBLICATIONS

"Ruby on rails—Implementing an Online Waiting Room," [online]. First Accessed on Oct. 7, 2011. Retrieved from the Interne!: http://stackoverflow.com/questions/2669891/implementing-an-online-waiting-room, 2 pg.

(Continued)

*Primary Examiner* — Nicholas Augustine
(74) *Attorney, Agent, or Firm* — Remarck Law Group PLC

(57) ABSTRACT

This disclosure describes techniques in which one or more computing devices receive a signal from a first client computing device. The signal indicates that the first client computing device is available for participation in a communication session that enables communication between the first client computing device and one or more other client computing devices. The one or more computing devices determine a context for a topic of discussion associated with the communication session. The context is associated with a content item capable of being outputted by the first client computing device. Responsive to receiving the signal, the one or more computing devices initiate the communication session and send an invitation to at least one of the one or more other client computing devices to join the communication session. The invitation indicates the context of the communication session to at least one of the one or more other client computing devices.

25 Claims, 4 Drawing Sheets

(56) References Cited

U.S. PATENT DOCUMENTS

| | | | |
|---|---|---|---|
| 7,983,927 B2 | 7/2011 | McGill et al. | |
| 7,984,098 B2 | 7/2011 | Enete et al. | |
| 8,032,470 B1* | 10/2011 | Heidenreich et al. | 706/45 |
| 8,443,041 B1 | 5/2013 | Krantz et al. | |
| 8,538,895 B2* | 9/2013 | Appelman et al. | 705/319 |
| 8,560,606 B2* | 10/2013 | Chakra et al. | 709/204 |
| 8,661,076 B2 | 2/2014 | Herman | |
| 8,700,714 B1 | 4/2014 | Pan et al. | |
| 8,843,834 B2 | 9/2014 | Wood et al. | |
| 2001/0048449 A1* | 12/2001 | Baker | 345/758 |
| 2002/0078150 A1 | 6/2002 | Thompson et al. | |
| 2002/0130904 A1* | 9/2002 | Becker et al. | 345/753 |
| 2003/0041326 A1 | 2/2003 | Novak et al. | |
| 2003/0074451 A1 | 4/2003 | Parker et al. | |
| 2004/0186887 A1 | 9/2004 | Galli et al. | |
| 2004/0218035 A1 | 11/2004 | Crook | |
| 2004/0249811 A1 | 12/2004 | Shostack et al. | |
| 2004/0260781 A1 | 12/2004 | Shostack et al. | |
| 2004/0267938 A1 | 12/2004 | Shoroff et al. | |
| 2005/0267766 A1 | 12/2005 | Galbreath et al. | |
| 2005/0273503 A1 | 12/2005 | Carr et al. | |
| 2006/0031772 A1* | 2/2006 | Valeski | 715/751 |
| 2006/0098085 A1 | 5/2006 | Nichols | |
| 2006/0176831 A1 | 8/2006 | Greenberg et al. | |
| 2006/0182249 A1 | 8/2006 | Archambault et al. | |
| 2006/0287106 A1 | 12/2006 | Jensen | |
| 2007/0020603 A1 | 1/2007 | Woulfe | |
| 2007/0050452 A1 | 3/2007 | Raju | |
| 2007/0071209 A1 | 3/2007 | Horvitz et al. | |
| 2007/0169165 A1 | 7/2007 | Crull et al. | |
| 2007/0208806 A1 | 9/2007 | Mordecai et al. | |
| 2007/0211141 A1 | 9/2007 | Christiansen | |
| 2007/0233291 A1 | 10/2007 | Herde et al. | |
| 2007/0299912 A1 | 12/2007 | Sharma et al. | |
| 2008/0070697 A1 | 3/2008 | Robinson et al. | |
| 2008/0140523 A1* | 6/2008 | Mahoney et al. | 705/14 |
| 2008/0192732 A1 | 8/2008 | Riley et al. | |
| 2008/0201638 A1* | 8/2008 | Nair | 715/706 |
| 2008/0209339 A1* | 8/2008 | Macadaan et al. | 715/745 |
| 2008/0209351 A1* | 8/2008 | Macadaan et al. | 715/762 |
| 2008/0222533 A1 | 9/2008 | Hankejh et al. | |
| 2008/0229215 A1 | 9/2008 | Baron et al. | |
| 2008/0256182 A1 | 10/2008 | Sekaran et al. | |
| 2008/0260138 A1 | 10/2008 | Chen et al. | |
| 2008/0273079 A1 | 11/2008 | Campbell et al. | |
| 2009/0040289 A1 | 2/2009 | Hetherington et al. | |
| 2009/0063995 A1* | 3/2009 | Baron et al. | 715/753 |
| 2009/0086957 A1 | 4/2009 | Kelley et al. | |
| 2009/0222742 A1 | 9/2009 | Pelton et al. | |
| 2009/0235183 A1 | 9/2009 | Hamilton et al. | |
| 2010/0057857 A1 | 3/2010 | Szeto | |
| 2010/0082693 A1 | 4/2010 | Hugg et al. | |
| 2010/0174783 A1 | 7/2010 | Zarom | |
| 2010/0192072 A1 | 7/2010 | Spataro et al. | |
| 2010/0203968 A1 | 8/2010 | Gill et al. | |
| 2010/0205541 A1* | 8/2010 | Rapaport et al. | 715/753 |
| 2010/0221693 A1 | 9/2010 | Gupta | |
| 2010/0226288 A1 | 9/2010 | Scott et al. | |
| 2010/0241580 A1* | 9/2010 | Schleier-Smith | 705/319 |
| 2010/0246448 A1 | 9/2010 | Krantz et al. | |
| 2010/0251124 A1 | 9/2010 | Geppert et al. | |
| 2010/0257577 A1* | 10/2010 | Grandison et al. | 726/1 |
| 2011/0055309 A1 | 3/2011 | Gibor et al. | |
| 2011/0092282 A1 | 4/2011 | Gary | |
| 2011/0106662 A1 | 5/2011 | Stinchcomb | |
| 2011/0107239 A1 | 5/2011 | Adoni et al. | |
| 2011/0126132 A1 | 5/2011 | Anderson et al. | |
| 2011/0154223 A1 | 6/2011 | Whitnah et al. | |
| 2011/0161987 A1 | 6/2011 | Huang et al. | |
| 2011/0185025 A1 | 7/2011 | Cherukuri et al. | |
| 2011/0185057 A1 | 7/2011 | Waugaman et al. | |
| 2011/0222466 A1 | 9/2011 | Pance et al. | |
| 2011/0231396 A1 | 9/2011 | Dhara et al. | |
| 2011/0269540 A1 | 11/2011 | Gillo et al. | |
| 2011/0271205 A1* | 11/2011 | Jones et al. | 715/753 |
| 2011/0283203 A1 | 11/2011 | Periyannan et al. | |
| 2011/0300841 A1 | 12/2011 | Archambault et al. | |
| 2011/0319175 A1 | 12/2011 | Jensen | |
| 2011/0320373 A1* | 12/2011 | Lee et al. | 705/319 |
| 2012/0092438 A1 | 4/2012 | Suarez et al. | |
| 2012/0124176 A1 | 5/2012 | Curtis et al. | |
| 2012/0150953 A1 | 6/2012 | Costanzo et al. | |
| 2012/0154510 A1 | 6/2012 | Huitema et al. | |
| 2012/0216129 A1 | 8/2012 | Ng et al. | |

OTHER PUBLICATIONS

"TJN Chat Room—The Jazz Newwork Worldwide," [online]. First Accessed Dec. 5, 2011. Retrieved from the Interne!: http://www.thejazznetworkworldwide.com/group/tjnchatroom, 17 pgs.

Apple, Inc. Using your built-in iSight camera. Nov. 14, 2011. accessed on Aug. 5, 2013 from Internet http;//support.apple.com/kb/ht1462. p. 1-2.

Avchat Video Chat "AVChat Video Chat Features, Tons of Features, Insanely Flexible," [online]. First Accessed Aug. 18, 2011. Retrieved from the Interne!: http://avchal.nel/features.php, 4 pgs.

ichat excerpt from http://www.apple.com/macosx/apps/all.html#ichat, downloaded Jul. 11, 2011, 1 p.

Parkes, Skype for iPhone will run in the background with iPhone OS 4. Apr. 8, 2010. The Big Blog [online]. Retrieved from the Internet: http://blogs.skype.com/en/2010/04/skype_for_iphone_will_run_in_t.html.

Roseman et al., TeamRooms: Network Places for Collaboration. 1996. ACM, Computer Supported Cooperative Work '96. p. 325-33.

Weisz et al., "Watching Together: Integrating Text Chat With Video," CHI 2007 Proceedings—Video, Apr. 28-May 3, 2007, San Jose, CA, pp. 877-886.

Wikipedia page: SkypeTM, last modified Jul. 10, 2011. 22 pp.

Wikipedia page: Tinychat, last modified Jun. 15, 2011, 2 pp.

www.tinychat.com, "Video chat with friends & meet new ones from all around the world—today," downloaded Jul. 11, 2011. 18 pp.

NNRD435158. "Automatically Moderated Group Debate on the Internet." IBM Technical Disclosure Bulletin. Jul. 2000, UK. Issue 435, p. 1299.

Blizzard Entertainment, "World of Warcraft", 2004, pp. 1-208.

MMO-Champion, "Post your character selection screen!", Oct. 27, 2009, retrieved on Feb. 18, 2015, retrieved from <http://www.mmo-champion.com/threads/675832-Post-you-character-selection-screen>, pp. 1-9.

\* cited by examiner

INITIATING A COMMUNICATION SESSION BASED ON AN ASSOCIATED CONTENT ITEM

This application claims the benefit of U.S. Provisional Application No. 61/497,923, filed Jun. 16, 2011, which is assigned to the assignee hereof and hereby expressly incorporated by reference herein.

TECHNICAL FIELD

The disclosure relates to communications, particularly to initiating a communication session between two or more users.

BACKGROUND

Various networks, including the Internet, allow users of computing devices to communicate with one another. One or more computing devices may be used by and/or associated with a user. Each computing device in turn may engage in a communication session with one or more other computing devices. The communication session may enable communication between the one or more users associated with each computing device engaged in the communication session. A communication session may feature mufti-way real-time text-based chat, real-time audio conversations, and/or video conferences. A computing device may maintain an association between each user of the computing device and other users associated with each user of the computing device in a variety of ways, such as through a contact list of users. The contact list may enable each user of the computing device to quickly find and communicate with other users. Users of a computing device may also interact with the computing device to select one or more users from the contact list to invite to the communication session.

SUMMARY

Techniques of this disclosure provide a method in which one or more computing devices receive a signal from a first client computing device. The signal indicates that the first client device is available for participation in a communication session that enables communication between the first client computing device and one or more other client computing devices. The one or more computing devices may determine a context for a topic of discussion for the communication session. The context is associated with a content item related to the first client computing device. In response to receiving the signal, the one or more computing devices initiate the communication session and send an invitation to join the communication session that indicates the context of the communication session to at least one of the one or more other client computing devices.

Another example provides a computing device that includes at least one processor configured to execute an application associated with a content item. The device also includes an input device configured to receive, by a user interface of the computing device, a user input indicating that a user of the computing device is available for participation in a communication session. The device further includes a network interface configured to output a signal to a server device in response to the user input. The signal indicates that the user is available to participate in a communication session that enables communication between at least the computing device and one or more computing devices. The signal indicates a context for the communication session based on the content item. The device further includes a display device to display a graphical representation of the communication session and a graphical representation of at least one content item associated with the communication session.

In another example, the disclosure is directed to a computer-readable storage medium comprising instructions. The instructions may cause at least one programmable processor of one or more computing devices to receive a signal from a first client computing device that indicates that the first client computing device is available to participate in a communication session that enables communication between the one or more computing devices and at least the first client computing device. The instructions also cause a first device to determine a context for a topic of discussion for the communication session that may be associated with a content item related to the first client computing device. The instructions also cause the first computing device to send an invitation to join the communication session that indicates the context of the communication session to at least one other client computing device.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

In accordance with common practice, the various described features are not drawn to scale and are drawn to emphasize features relevant to various embodiments. Like reference characters denote like elements throughout the figures and text.

DETAILED DESCRIPTION

Overview

Figure 1:
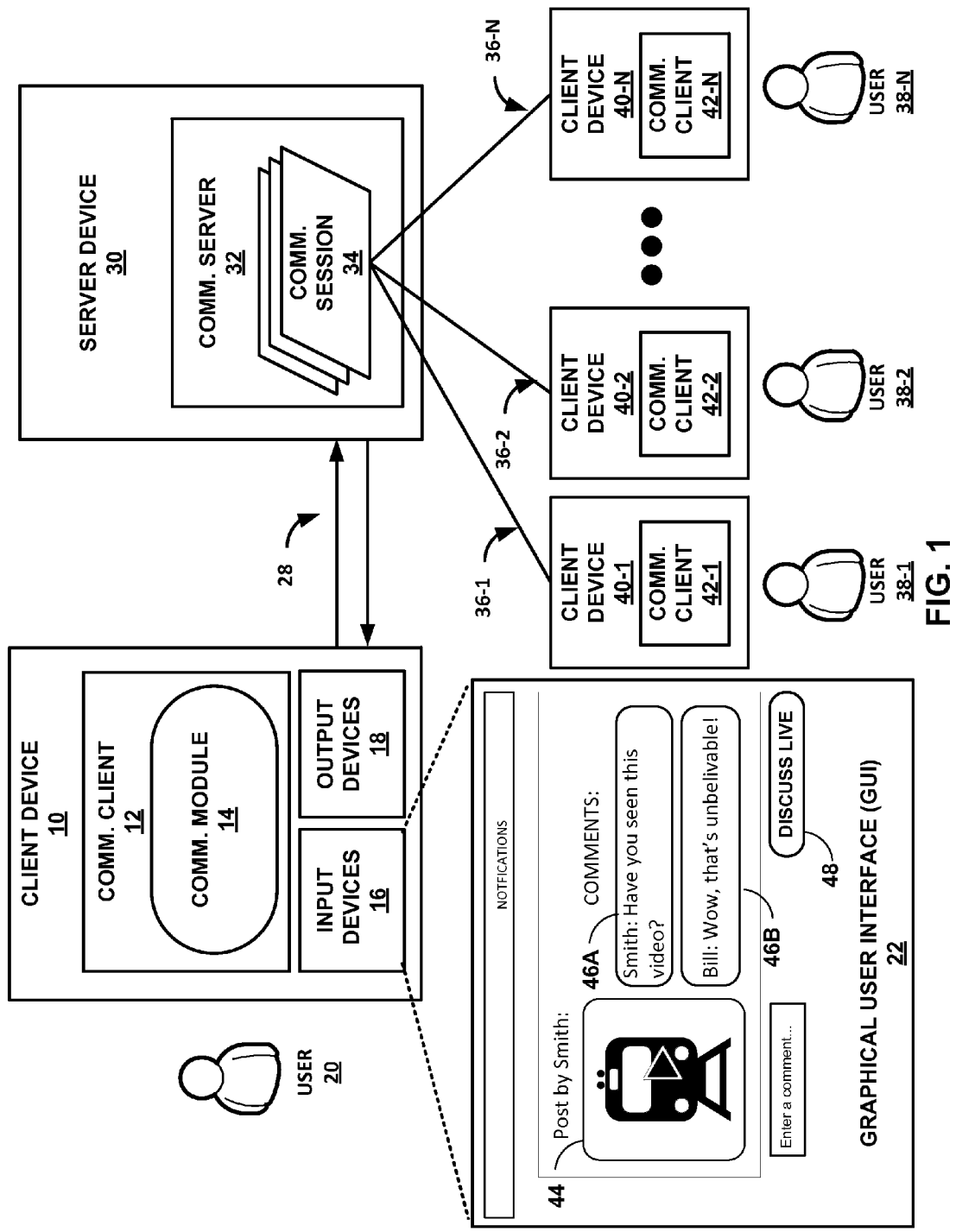
FIG. 1 is a conceptual diagram illustrating an example of one or more computing devices connected to a server device hosting one or more communication sessions that enable communication between computing devices, in accordance with one or more aspects of the present disclosure.

Users of computing devices may wish to engage in a communication session with other users who share similar interests or have interacted with similar content items, such as videos, audio transmissions, blog posts, electronic files, and other electronic media. Content items may be accessible through various networks, such as the Internet. Other users may also interact with the content items. Content items may have a context, such as a topic of interest. A user may want to interact with other users regarding some element of the content items or some particular topic. For example, a user may wish to discuss a portion of a document or video. Based on the context, a user may engage with one or more other users regarding that context for example using real-time text-based communications, real-time audio, and/or real-time video communications.

Users of a computing device may engage the computing device in one or more activities. Based on the activities that the computing device is currently engaging in or has previously engaged in, the computing device may determine a context with which the user is associated. For example, users of websites, blogs, social networks, instant messaging networks, mobile networks and/or other online services may interact with content items, such as videos, images, electronic files, hyperlinks, audio data, a webpages, and/or text-based conversations. These content items may be associated with a context, which may be used as a topic of discussion for a communication session. A context-based communication session may be a real-time, multi-way communication session. That is, the communication session may feature at least one of real-time text-based communications, audio communications, and video communications from one or more users, each of whom may be associated with a common context.

A computing device may initiate a communication session having a topic that may be based on the context. Based on at least one of an interaction of other users with a particular content item or an interest in a particular context related to the content item, a computing device may invite one or more of the other users to the communication session. That is, the computing device may invite one or more other users based on whether or not the one or more other users have an association with the context of the communication session, invitations sent to computing devices of the one or more invited users may include a topic for the communication session, which may also be based on the context and users receiving an invitation may be associated with the context of a communication session.

When a first user is seeking to engage in a communication session with other users, the first user may select an option to engage in a communication session with one or more users that share a common context with the first user. For example, the first user may create a text-based post, such as a blog post, comment on a forum, a comment on a social media network, or another form of text-based communication. For example, when the first user uses a social media application to post a comment on an article posted by a second user, both the comment of the first user and the article posted by the second user may be text-based posts. A context common to both the first user and the second user may be the article. The first user may initiate a communication session having the common context and invite the second user to join the communication session.

To engage in a communication session with an associated context, a user of a first computing device may indicate that the first computing device is available to engage in a communication session. A server device, which may, for example, comprise one or more computing devices, may send a notification signal to the first computing device. A notification signal may include one or more packets, such as a Universal Datagram Protocol (UDP) or Transmission Control Protocol (TCP) packets or any other type of packet capable of being received by a computing device, such as server device 30 or client device 10. A notification signal may also be a wireless signal, such as a signal compatible with or a signal sent with another protocol, such as hypertext transfer protocol (HTTP), or another protocol capable of being sent and/or received by a computing device.

The notification signal may indicate to a computing device, such as client device 10, that an event has occurred. In some examples, a user may respond to a notification signal. In some examples, the notification may indicate that a user may initiate a communication session, that a user may join a communication session which has already been initiated, or any other information that a user may respond to. The notification signal may also indicate that the computing device may initiate a communication session with a context. In addition to sending a signal to the first computing device, the second computing device may also determine the context for the communication session.

In response to the notification signal, the second computing device may receive a notification indicating that a communication session has been initiated. In some examples, the notification may be a touch-target notification. A touch-target notification may be a notification that also may include a virtual button or target that a user may interact with using an input device, such as a touch pad or other touch-sensitive device, or a pointing device, such as a mouse or trackball, or another touch- or target-based input device. As an example, a touch-target notification may be a notification indicating a user has been invited to join a communication session. A user may interact with a touch-target corresponding to a graphical representation of the notification. In response to interacting with the touch-target, the computing device may take one or more actions, such as attempting to join the communication session associated with the invitation.

As stated above, the user may join the communication session, for example, by interacting with a touch-target, such as a virtual or physical button which, when toggled or otherwise activated, enables the first computing device to initiate a connection request to join the communication session. A touch target may be a graphical representation that a user may interact with on a touch-sensitive or presence-sensitive screen. The graphical representation may be an icon, link, user interface control, menu item, form field, or another user interface component or application component that a user may interact with and that a computing device may respond to in some manner. A user may activate a touch target by interacting with an input device, such as a touchpad or a touchscreen and selecting, dragging, or otherwise manipulating the touch-target. Upon initiating the communication session, one or more additional users may also be invited to the communication session. The one or more additional users may receive invitations via e-mail, an instant message, or another form of communication, and may accept the invitation to join the communication session.

In some examples, a communication session may be initiated without a server device. A user of the first computing device may indicate that the first computing device is available to engage in a communication session. Rather than send a message to a server device, the first computing device may initiate a communication session. The first computing device may determine a context for the communication session based on an associated content item. The first computing device may further invite one or more other computing devices to the communication session based on the associated context. The one or more other computing devices may output one or more indications of the received invitations to one or more users of client devices. Users may accept the invitations, and in response, the one or more other client devices may signal the first computing device to join the communication session.

Example Systems

FIG. 1 is illustrates an example of one or more client devices 10 and 40-1 through 40-N connected to a server device 30 hosting a communication server 32, which may host one or more communication session, such as communication session 34. Communication session 34 may enable communication between client devices 10 and 40-1 through 40-N and may have a context associated with a content item, in accordance with one or more aspects of the present disclosure. Client devices 10 and 40-1 through 40-N may be able to engage in a real-time video or audio communication session together.

Examples of client devices 10 and 40-1 through 40-N (collectively referred to as "client devices 40" or "client computing devices 40"), may include, but are not limited to, stationary devices such as desktop computers, portable or mobile devices such as mobile phones (including smart phones), televisions with one or more processors embedded therein or coupled thereto, tablets, laptop computers, personal digital assistants (PDAs), portable gaming devices, portable media players, e-book readers, and the like. Client device 10 and each of client devices 40 may be the same or different types of devices. For example, client device 10 and client device 40-1 may both be mobile phones. In another example, client device 10 may be a mobile phone and client device 40-1 may be a desktop computer.

At least client device 10 may include a graphical user interface (GUI) 22 that allows a user 20 of client device 10 to create or join a communication session, such as communication session 34, which other users, such as users 38-1 through 38-N (collectively referred to as "users 38") may also join. A user, such as user 20, may interact with a touch-target, such as button 48 which may cause client device 10 to attempt to initiate communication session 34. In response to client device 10 initiating communication session 34, communication server 32 may send invitations to users, such as one or more of users 38-1 through 38-N to join communication session 34. In other examples, server device 30 initiates communication session 34.

A communication session as used herein is a broad term encompassing as its plain and ordinary meaning, including but not limited to, one or more objects, which may be stored in and/or are executable by hardware, that may enable communication clients coupled to the one or more objects to exchange information. The one or more objects may include data and/or provide functionality of a communication session as described herein. The communication session may include, e.g., a multi-user videoconference and/or a channel for sharing digital content, text message, etc.

Client device 10 of FIG. 1 may include a communication client 12, one or more output devices 18, and one or more input devices 16. Communication client 12 may further include a communication module 14 that causes output device 18 to display graphical user interface 22. Communication module 14 may further include functionality that enables communication client 12 to connect to communication server 32 and join one or more communication sessions, such as communication session 34. Two or more client devices (for example, client device 10 and client device 40-1) may join communication session 34 to enable communication, such as video and/or audio chat, between the two or more client devices Communication client 12 and communication server 32 may exchange audio, video, images, text, or other information. The information exchanged between communication client 12 and communication server 32 may be selected, at least in part, on the hardware and/or software capabilities of client device 10. For example, if client device 10 is a mobile device with relatively lower bandwidth and computing resource capabilities, communication server 32 may reduce the number and/or quality of the audio and/or video streams sent to client device 10 than if client device 10 was capable of higher bandwidth and had additional computing resource capabilities. Furthermore, communication client 12 may dynamically adjust the bit rate required to send the information to communication server 32 by, for example, reducing the quality of the audio and/or video being sent to communication server 32.

In the example of FIG. 1, one or more of client devices 40 of one or more users 38 are connected to or may connect to a communication session 34 hosted by server device 30 comprising communications server 32. For example, client devices 10 and 40-1 through 40-N may engage in communication session 34. Each client device may include one or more output devices, which may display a graphical user interface. For example, at least client device 10 may include output device 18, which displays graphical user interface (GUI) 22.

Output device 18 may display a graphical representation of an application, such as a web browser or a social networking application, which may be a part of graphical interface 22. The graphical representation of the application included in graphical interface 22 may include graphical representation 44 of a content item, illustrated as a video clip in FIG. 1, which may include comments, such as comments 46A and 46B (collectively referred to as, "comments 46"). Graphical interface 22 may also include a user interface component, such as a button 48, which may be a touch-target that a user may interact with to initiate or connect to communication session 34. A content item may provide the context for communication session 34. Once a user, such as user 20, has joined communication session 34, graphical user interface 22 may display graphical representations of one or more users connected to communication session 34. In another example, GUI 22 also displays graphical representations of one or more users who may be available to engage in communication session 34. An example of the one or more users connected to a common communication session is illustrated in FIG. 3.

Users of websites, blogs, social networks, or other online services, such as users 38 and user 20, may post information, such as a content item. A user may post the content item, for example, by posting it on a social network or another network that allows users to post content. Posting a content item may include providing information or data from a first computing device to a second computing device, which may include, for example, uploading information or data onto a website. A content item may be, for example, at least one of a video, an image, an electronic file, a hyperlink, an audio data, a webpage, a text-based conversation thread, or the like. For example, a content item may be a video that a user shares on YouTube™, a blog post, an article from a news site, a digital image posted on an image sharing site, a music file, a video podcast, a presentation, a status update on a social network, and/or a text-based conversation, such as a real-time chat session or one or more threaded comments posted on a website.

A video content item may be a pre-recorded video clip that may be posted on a social network, a video podcast, or a video posted on a video sharing site, such as YouTube™. A video may also comprise a real-time stream, such as a video conference, or a live video feed from an event, such as a sporting event or a newscast. An image may comprise a digital photograph, or any other digital still or animated image format. Audio data may include an audio file, such as any uncompressed or compressed digital audio file including MPEG Audio Layer 3 (MP3), Waveform Audio File Format (WAV), or other similar formats, as well as streaming audio, such as a radio broadcast, podcast, or other audio format. A hyperlink may be a link to a uniform resource locator (URL) or a link to another resource, such as an e-mail, or a stored contact. One or more comment thread content items may also be associated with the blog post, article, social media post, and/or status update.

A content item may be used to define the context for a communication session. The context may be determined from the content item in a number of different ways. For example, a user may author a content item, such as a blog post or an article or other type of media. A user may also share a content item on a social networking or another network-based service. The authored or shared content may be a content item that may be associated with a context for a communication session.

A context may be formed or defined through an interaction with a content item, which may vary based on the type of the content item. For example, a computing device may display a video clip, play audio, display the contents of a file, display an article, and/or transmit comments related to a social network post. Users engaging in interactions with the same or similar content items may also be associated with the context for the communication session. These interactions with the content item may create a common association between each of the users who have interacted with the content item.

In the example of FIG. 1, GUI 22 includes a graphical representation 44 of a content item, which may be a video clip. One or more output devices 18 of client device 10 may display the graphical representation 44 of the content item. A graphical representation of a content item may include an image, animation, icon, and/or video. A graphical representation of a content item may indicate one or more content types associated with the content item. The graphical representation 44 of the content item may also change from one type of representation to another. In some examples, the graphical representation 44 of a content item may be a musical note icon indicating that the content item is an audio file, podcast, or other audio data. The graphical representation 44 of the content item may also be a still, such as a digital photograph. In the case of the digital photograph, the content item and the graphical representation 44 of the content item may be the same or similar. In a case where the content item is a video, the graphical representation 44 of the content item may include an icon, such as a camera, overlaid with a frame of the video to indicate that the content item is a video. Upon a user playing content item 44, the graphical representation of the content item may change from the icon overlaid with the video frame to the video itself.

The content item may have been posted by a user, such as user 20, on a social network. The content item may have one or more additional content items associated with the content item. In the example of FIG. 1, content item associated with graphical representation 44 may be associated with comments 46A and 46B (collectively referred to as "comments 46") for the purposes of determining a context for a communication session. Users, such as users 38-1 and 38-2, may have used a computing device, such as client devices 40-1 and 40-2 respectively, to post comments 46A and 46B.

User 20 may interact with GUI 22 to initiate a communication session with a context associated with one or more content items. In the example of FIG. 1, a user, such as user 20 may wish to initiate a communication session associated with the content item of graphical representation 44 and comments 46. User 20 may interact with a touch-target, such as button 48, which may indicate to user 20 that interacting with button 48 may initiate a real-time communication session. User 20 may interact with button 48, and trigger client device 10 to send a signal over a communication channel 28 to server device 30. Communication server 32 of server device 30 may generate or maintain one or more communication sessions, such as communication session 34. Communication sessions 34 may be used to select one or more associated users 38 of client devices 40, to invite to communication session 34. Various components described in FIG. 1 may include similar properties and characteristics as described throughout this disclosure.

Server device 30 may receive a signal from client device 10 requesting to initiate a communication session, such as communication session 34. In some examples, the signal provides the context for communication session 34. In examples where the signal does not provide the context, server device 30 may attempt to determine the context for communication session 34. To determine a context for communication session 34, server device 30 may look to a variety of properties of the one or more content items associated with the communication session to determine a context for communication session 34. The content items may be associated with communication session 34 because of a button 48 or another interface component that when activated, may cause a computing device to signal the association between the one or more content items and communication session 34. Based on the context, server communication server 32 may determine client devices, such as client devices 40, to invite to communication session 34.

Properties that server device 30 may consider in determining a context for a topic of discussion for communication session 34 may include at least one of one or more tags associated with a content item, one or more keywords associated with the content item, a title of the content item, one or more words from the content item, a geographic location associated with the content item or client device 10, an author of the content item, and one or more users who have commented on the content item. Users may be known to be associated with client devices through login information, IP addresses, e-mails, and other similar identifying characteristics. Keywords may be words that occur frequently within a document or words that are assigned used to catalog a content item. Tags may be a particular type of keyword and/or may be one or more words or phrases that are associated with, and may classify, a content item. Tags may be assigned by users for themselves or each other and may be directly visible to other users. Users may provide tags for a content item or tags may be automatically generated based on the subject matter or contents of a content item. In the example of FIG. 1, server device 30 may also consider one or more of the title of the content item, the fact that user 20 shared the content item, that users 38-1 and 38-2 have commented on the content item, and the text of comments 46 to determine a context for a topic of conversation for communication session 34.

A user may also specify the topic of conversation for the communication session. In the example of FIG. 1, user 20 may interact with a touch-target, such as button 48 of GUI 22. Button 48 may indicate that interacting with button 48 may allow user 20 to choose a topic or context for communication session 34. In response to receiving user input selecting the context, client device 10 may send a signal to server device 30 indicating that user 20 wishes to specify a topic of conversation for communication session 34. Server device 30 may send a response signal to client device 10, which may cause client device 10 to prompt user 20 for a topic of conversation for communication session 34. User 20 may input a topic of conversation for communication session 34 using one or more of input devices 16. Client device 10 may send a signal via communication link 28 to communication server 32 of server device 30. Communication server 32 may use the topic of conversation received from client device 10 for communication session 34.

Based on the context that server device 30 determines, server device 30 may determine a topic of conversation for communication session 34 and initiate communication session 34. Server device 30 may also select one or more other computing devices 40, each having one or more associated users, to invite to communication session 34. A computing device, such as server device 30, may, for example, determine whether one or more users 38 of the one or more other computing devices have interacted with a content item, have a proximate geographic location with the content item, have been tagged in association with the content item, and/or have specified an interest in a topic associated with the content item.

To determine whether a user 38-1 of computing device 40-1 has commented on a content item, a computing device, such as server device 30, may examine information associated with the content item. An identifying attribute may be as a username, e-mail address, or IP address, or another identifying characteristic that the server device 30 is familiar with. Server device 30 may also be able to determine another computing device to invite to the communication session by determining that the other computing device or a user associated with the other device has interacted with the content item. Server device 30 may, for example, identify a user using a particular client device to invite to the communication session because the user associated with the device may have rated a video or a song, or edited a document. Server device 30, may also be able to identify a computing device 40-1 by determining one or more users 38 who have been tagged in association with the content item. If a content item has users tagged in it, such as photograph or a video on a social network, a computing device may similarly be able to identify the users and/or devices associated with the users in the photograph.

A content item may also be associated with geographical information, such as latitude and longitude coordinates. Example content items may include a "check-in" of a location-based service, which may use coordinates of a global navigation satellite system (GNSS), such as global positioning system (GPS), to indicate where a user is located or a photo that is associated with location data to indicate where the photograph was taken. A computing device may determine additional users associated with content devices that are proximately geographically associated with the content item, such as users who are nearby the content item.

In the example of FIG. 1, user 38-1 posted comment 46B associated with a content item that is represented by graphical representation 44. When server device 30 is instructed to initiate communication session 34 having a context associated with the content item, server device 30 may invite client devices that are being used by one or more users who have interacted with the content item. In this example, server device 30 invites client device 40-1 because user 38-1, who is currently using client device 40-1, has posted comment 46B, which is associated with the content item. In some examples, user 38-1 may have posted comment 46B using a different client device than client device 40-1. Additionally, server device 30 may determine that user 38-2 of client device 40-2 should also be invited to communication session 34 due to the fact that user 38-2 is tagged in the content item. Server device 30 may also invite user 38-N to communication session 34 because client device user 38-N is within a selected distance from geographical coordinates associated with the content item.

Once communication server 32 has determined which users are to be invited to communication session 34, communication server may send one or more invites to one or more client devices used by the selected one or more users over at least one communication channel. In the example of FIG. 1, communication server 32 may send invitations to client device 40-1 over communication channel 36-1, client device 40-2 over communication channel 36-2, and client device 40-N over communication channel 36-N.

Each invitation to communication session 34 may include the context, that is, a topic of conversation for the communication session. For example, the topic for communication session 34 may be the title of the content item associated with communication session 34, or may be determined from the contents of the content item, such as audio, text, images, or video. The topic of conversation for communication session 34 may also be derived from other content items associated with the content item, such as comments 46. For example, communication server 32 may determine that at least part of the text of comment 46A is the topic of conversation for communication session 34 and may include that text in the invitations sent to client devices 40-1, 40-2, and 40-N. Invites for communication sessions having user-specified topics of conversation may similarly include the topic of conversation.

Users, such as 38-1, 38-2, and 38-N, may receive invitations and/or notifications of invitations to communication session 34 in a variety of different ways. Users 38-1 through 38-3 may receive notification of the invitations in a notification or status bar. A notification or status bar may be a graphical user interface component that displays information. For example, a notification or status bar may stretch across a portion or window of a GUI or display device. The notification or status bar may display alerts to notify a user when an event has occurred, such as the receipt of a new message, invitation to a communication session, or another notification or event. An example of a notification bar may be a notification bar present on some mobile devices or a notification bar of another application, such as a social network. The notification bar may indicate the number of notifications that a user has not yet reviewed. The user may interact with the notification bar to view, clear, and act upon one or more items, such as one or more invitations to a communication session.

Invitations may also be sent via an instant message, such as a chat message or another form of instant messaging. Instant messages may be sent through a social networking application, a standalone instant messaging application, and/or a website. In some examples, an instant message may be received on mobile computing devices.

In another example, the invitations may be displayed as notifications along with a content item of a communication session with which the invitation is associated. In the example of FIG. 1, a notification may appear on or near the graphical representation of content item 44 displayed on client device 40-1. The notification may indicate that user 38-1, is invited to engage in a communication session. The notification may be an icon, text, and/or animation, and may be displayed in such a manner as to draw a user's attention to the fact that a communication session has been created, such as through use of motion or changing colors.

In yet another example, a user, such as user 38-1, may receive one or more invitations to communication session 34 through e-mail. The e-mail may specify the topic of conversation for communication session 34, and may include a hyperlink that allows user 38-1 to join communication session 34.

User 38-1 may also receive an invitation to a communication session in a text-based feed. The text-based feed may be a stream of status updates of users of a social network. When a communication session, such as communication session 34, is initiated, the stream may contain a post or status update with a link that user 38-1 can follow to join communication session 34. A websites or Wog may also have a comment feed that is updated in real-time as users post comments on a particular story or article. For example, an invitation to a communication session may be posted in the real-time feed of comments inviting one or more of the commenting users, such as users 38, to join a communication session related to the story or article. When displaying an invitation in a text-based feed, the invitation may be "pinned," that is, the invitation may remain in a specific position in the text-based feed so that the invitation is displayed even as users post additional updates to the feed.

Once users receive one or more invitations to a communication session, such as communication session 34, each user may accept or decline the invitation. For example, if user 38-1 accepts an invitation, client device 40-1, associated with user 38-2, may attempt to join communication session 34. Client device 40-1 may send a signal to sever device 30 requesting entry to communication session 34 via communication channel 36-1. The signal may contain information specifying a specific communication session to join, as well as information identifying and/or authenticating user 38-1 to communication server 32.

In another example, communication module 42-1 of client device 40-1 may receive an invitation to communication session 34 from communication server 32 of server device 30. Client device 40-1 may display the invitation to user 38-1. Upon receiving the invitation, client device 40-1 may provide a notification, such as a virtual button that indicates that user 38-1 may join communication session 34. The notification may appear next to the graphical representation of a content item associated with communication session 34. The notification may be a touch-target that user 38-1 may interact with using an input device, such as a touch screen, of client device 40-1. User 38-1 may send user input to client device 40-1. In response to the user input, communication module 42-1 of client device 40-1 may send a signal to communication server 32 of server device 30 requesting that the client device join communication session 34.

In an example where a user accepts an invitation to a communication session, but is not currently viewing or otherwise interacting with one or more content items associated with the communication session, the computing device may display the one or more content items associated with the communication session. For example, when joining communication session 34, server device 30, may signal client device 40-1 that the client device 40-1 device is joining the communication session. In response to this signal, client device 40-1 may display a graphical representation of the content item that transitions to a graphical representation of the communication session. This transition may appear to the user as if the content item is rotating or flipping as the content item transitions into the communication session. The process of transitioning from the display of the content item to the display of the communication session is further described with regard to FIG. 3.

Once a user, such as user 20 initiates a communication session, such as communication session 34, and one or more users, such as users 38-1 through 38-3, join the communication session, users may begin communicating with one another. Communication session 34 may comprise one or more of real-time text-based conversation, audio-based conversation, and/or video-based conversation. A communication session may involve one or more users, and each user may be represented in the communication session by a graphical representation. Each graphical representation may be one or more of a still image, video, geographic, or other graphical representation. A user that is currently communicating with other users, such as by speaking, typing a message, or sharing an image, video, audio clip, or other electronic data, may be displayed with a larger graphical representation than the other users of the communication session. The functionality of an example communication session, such as communication session 34 is further illustrated with regard to FIG. 3.

During the communication session, the one or more users in the communication session may exchange communication data with one another. As users exchange this communication data with one another, the communication data may be transmitted to one or more computing devices viewing the content item that are not currently engaged in the communication session in real-time. In this manner, users who do not wish to participate or are not able to participate in a communication session may still be able to receive the communication data from the one or more users who are engaged in the communication session.

As an example, a user, such as user 38-N, may not be able to join communication session 34 because communication session 34 is restricted to a finite number of users that has already been reached. Communication session 34 may be associated with a content item, represented with graphical representation 44, and comments 46. Users 20, 38-1, and 38-2 may be engaged in communication session 34 and may exchange communication data with each other. Communication server 32 may notify another user, such as a user 38-N, that a communication session associated with the content item is in progress. User 38-N may enter user input requesting that a client device 40-N receive the information exchanged in communication session 34 in real-time.

In response to receiving the user input to receive the information exchanged in communication session 34, client device 40-N may send a message request to communication server 32. The message may request data or other information. The message request may be a packet, such as a TCP or UDP packet, or another data unit of a protocol which a computing device may receive. The message request may include contents which identify client device 40-N so that server device 30 or another computing device, in the case of a communication session initiated without a server or in a decentralized fashion, may send the information exchanged in the communication session to client device 40-N.

In response to the message request, communication server 32 may accept or reject the message request of user 38-N based on one or more criteria, such as whether the one or more users engaged in communication session 34 wish to share their communication data with someone outside the communication session. If communication server 32 accepts the request to transmit the information exchanged, communication server 32 may transmit information exchanged in the communication session to client device 40-N. Transmitting information exchanged may include transmitting audio, video, textual, or other data exchanged in communication session 34 via a communications channel, such as communications channel 36-N. The transmitted data may be in the forms of packets, such as UDP or TCP packets, or another data unit of another protocol, which a computing device, such as client device 40-N may receive. Client device 40-N may update content item 44 by displaying the communication data exchanged in communication session 34 along with the graphical representation 44 of the content item. As an example, the communication data may be displayed as a threaded conversation with additional threads being displayed and added to the conversation as communication data is exchanged between the users of the communication session.

A communication session may proceed with one or more users communicating until the communication session ends. The communication session may end, for example, when all users have left the communication session or when a moderator user designates that the communication session has ended. After the communication session has ended, a computing device, such as server device 30, may provide some information exchanged in the communication session along with the content item to one or more computing devices. For example, the information may be a transcript of dialogue spoken during the communication session. As an example, after communication session 34 has ended, communication server 32 of server device 30 may provide the information exchanged in the communication session along with the content item to a client device 10 that accesses the content item. The computing device may further output the content item along with the information exchanged. Being able to access a record of a communication session after it has ended may be useful, for instance, when a user is not able to access a communication session because the user was unavailable the time the communication session actually took place. Similar to how a computing device may display real-time updates as a threaded conversation along with the content item, a computing device may also be able to display a communication session that has ended as a threaded conversation or using another display technique to represent the communication data from the communication session.

Example Client Device

Figure 2:
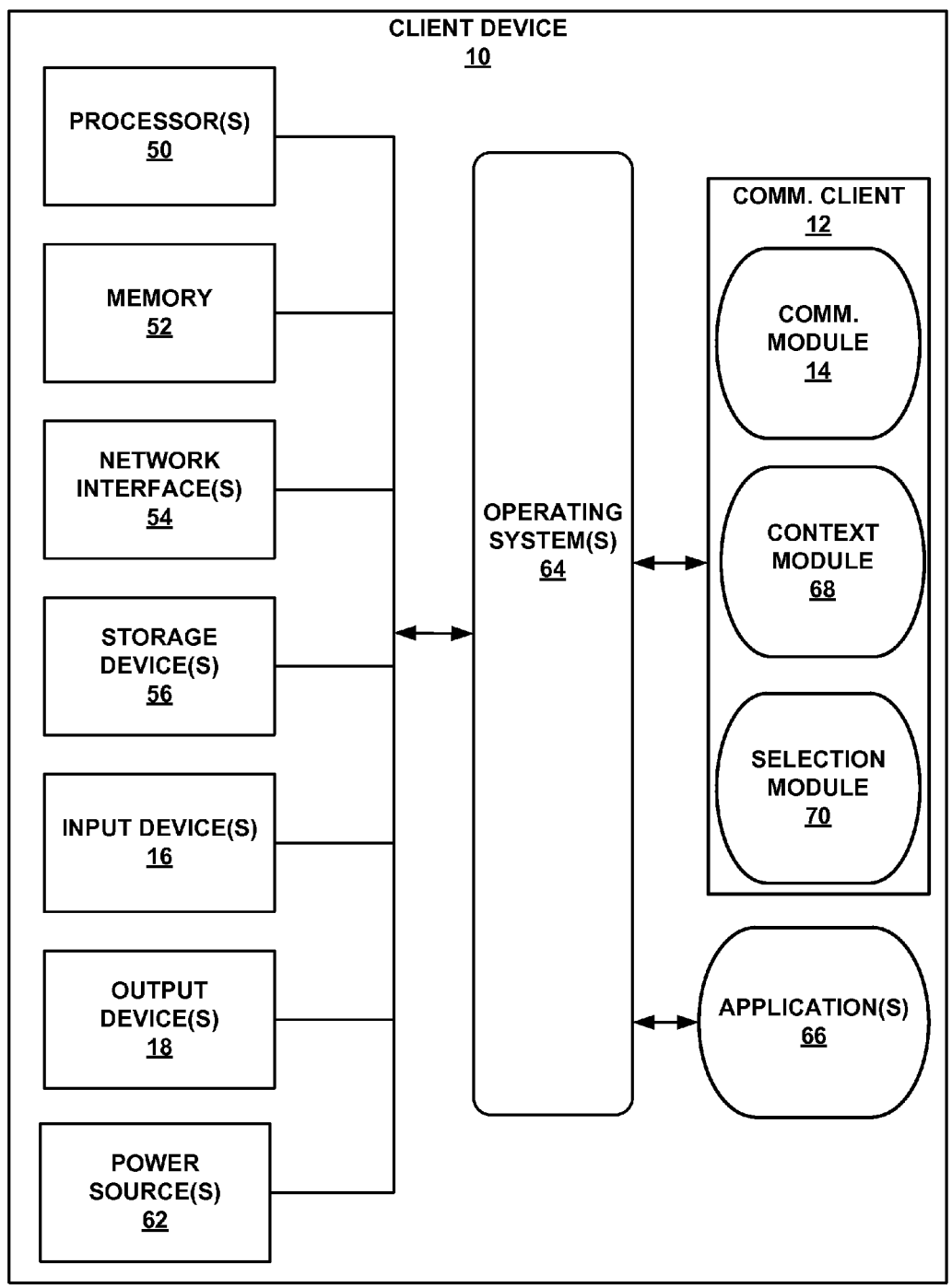
FIG. 2 is a block diagram illustrating further details of one example of a computing device shown in FIG. 1, in accordance with one or more aspects of the present disclosure.

FIG. 2 is a block diagram illustrating further details of one example of a client device 10 shown in FIG. 1, in accordance with one or more aspects of the present disclosure. FIG. 2 illustrates only one particular example of client device 10, and many other example embodiments of client device 10 may be used in other instances. Additionally, one or more client devices 40-1 through 40-N may be similar to client device 10 as shown in FIG. 2. In other examples, client device 10 may be a server device.

As shown in the specific example of FIG. 2, client device 10 includes one or more processors 50, memory 52, one or more network interfaces 54, one or more storage devices 56, one or more input devices 16, one or more output devices 18, and one or more power sources 62. Client device 10 also includes one or more operating systems 64 that are executable by client device 10. Client device 10, in one example, further includes communication client 12 that is also executable by client device 10. Communication module 14 may include a context module 68 and a selection module 70. Context module 68 may provide functionality for determining a context for a communication session. Such functionality may include the ability to determine a content item associated with a communication session. The context module may determine further associations with the content item, such as with additional content items including one or more comments or other interactions made with the content item.

Selection module 70 may select one or more users to invite to a communication session, such as communication session 34 of FIG. 1. Selection module 70 may select one or more users, such as one or more of users 38 of FIG. 1, to invite to the communication session based on the context associated with the communication session, which selection module 70 may have previously determined. Selection module 70 may select the one or more users based on one or more criteria, such as whether the users have interacted with a content item, have a geographic relationship to a content item, have specified an interest in a content item, or have been tagged in a content item. Selection module 70 may further interoperate with communication module 14 to send invitations to join the communication session to the one or more selected users.

Client device 10 may further include one or more applications 66, which the one or more processors 50 may execute. Each of components 50, 52, 54, 56, 16, 18, 62, 64, 66, 68, 70, and 12 may be interconnected (physically, communicatively, and/or operatively) for inter-component communications. One or more processors 50, in one example, may be configured to implement functionality and/or process instructions for execution within client device 10. For example, one or more processors 50 may be capable of processing instructions stored in memory 52 or instructions stored on storage devices 56.

Memory 52, in one example, is configured to store information within client device 10 during operation. Memory 52, in some examples, is described as a computer-readable storage medium. In some examples, memory 52 is a temporary memory, such that memory 52 is not used for long-term storage. Memory 52, in some examples, may be a volatile memory, meaning that memory 42 does not maintain stored contents when client device 10 is powered off. Examples of volatile memories include random access memories (RAM), dynamic random access memories (DRAM), static random access memories (SRAM), and other forms of volatile memories known in the art. In some examples, memory 52 is used to store program instructions for execution by processors 50. Memory 52, in one example, is used by software or applications running on client device 10 (for example, one or more other applications 66) to temporarily store information during program execution.

Storage devices 56, in some examples, may also include one or more computer-readable storage media. Storage devices 56 may be configured to store larger amounts of information than memory 52. Storage devices 56 may further be configured for long-term storage of information. In some examples, storage devices 56 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Client device 10, in some examples, also includes one or more network interfaces 54. Client device 10, in one example, utilizes one or more network interfaces 54 to communicate with external devices via one or more networks, such as one or more wireless networks. Network interface 54 may be a network interface card, such as an Ethernet card, an optical transceiver, a radio frequency transceiver, or any other type of device that can send and receive information. Other examples of such network interfaces 54 may include Bluetooth®, 3G and WiFi® radios in mobile computing devices as well as USB. In some examples, client device 10 utilizes network interface 54 to wirelessly communicate with an external device such as server device 30 of FIG. 1, a mobile phone, or other networked computing device.

Client device 10, in one example, also includes one or more input devices 16. Input devices 16, in some examples, may be configured to receive input from a user through tactile, audio, or video input. One or more input devices 16 may also be output devices. Examples of input device 16 include a presence-sensitive screen, a mouse, a keyboard, a voice responsive system, video camera, microphone, or any other type of device for detecting a command from a user. In some examples, a presence-sensitive screen includes a touch-sensitive screen.

A presence-sensitive screen is a screen, such as a liquid crystal display (LCD), plasma screen, cathode ray tube (CRT), or other display, which may detect when a user, such as user 20, is present at a computing device, such as client device 10. The presence-sensitive screen may include one or more cameras or other sensing devices for detecting the presence of the user. The presence sensitive screen may also detect one or more movements of the user, such as a gesture or other motion made by the user. In response to the presence of a user or an action or gesture made by the user, the computing device may take one or more actions.

One or more output devices 18 may also be included in client device 10. Output devices 18, in some examples, may be configured to provide output to a user using tactile, audio, and/or video output. One or more output devices 18 may also be input devices. Output device 18, in one example, includes a presence-sensitive screen, a speaker, a motor, and may utilize a sound card, a video graphics adapter card, and/or any other type of device for converting a signal into an appropriate form understandable to humans or machines. Additional examples of output device 18 include a touch sensitive screen, CRT monitor, an LCD, and/or any other type of device that can generate output to a user.

Client device 10, in some examples, may include one or more power sources 62, which may be rechargeable and provide power to client device 10. One or more power sources 62 may be internal to client device 10, such as a battery, or may be an external power source. In some examples where one or more power sources 62 are one or more batteries, the one or more batteries may be made from nickel-cadmium, lithium-ion, or other suitable material.

Client device 10 may include one or more operating systems 64. Operating systems 64, in some examples, may control the operation of components of client device 10. For example, operating system 64, in one example, facilitates the interaction of communication client 12 with processors 50, memory 52, network interfaces 54, storage devices 56, input devices 16, output devices 18, and power sources 62. If client device 10 includes more than one operating system, client device 10 may run one operating system and switch between others, and/or may virtualize one or more of operating systems 64. As shown in FIG. 2, communication client 12 may include communication module 14 as described in FIG. 1. Communication client 12 and communication module 14 may each include program instructions and/or data that are executable by client device 10. For example, communication module 14 may include instructions that cause communication client 12 executing on client device 10 to perform one or more of the operations and actions described in the present disclosure.

In some examples, communication client 12 and/or communication module 14, as well as context module 68, and selection module 70, may be apart of operating system 64 executing on client device 10. In some examples, communication client 12 may receive input from one or more input devices 16 of client device 10. Communication client 12 may, for example, receive audio or video information associated with a communication session from other computing devices participating in the communication session. As an example, communication client 12 may be one of a mobile application, or a web browser, or other similar client capable of communicating with a communication session. In an example where communications client 12 comprises a web browser, communication module 14 may comprise a browser extension or a plugin that permits client device 10 to perform one or more of the operations and actions described in the present disclosure.

A user may, for example, download and install a plugin with a web browser or another application. The plugin may execute simultaneously with or be executed by the application that plugin is added to. The graphical output of executing the plugin may display graphical output of a communication session, including any effects associated with a transition from a graphical representation of the content item to the communication session. Such effects may include rotational effects and other three-dimensional effects. The plugin may also display graphical information related to the communication session. The graphical information may include for example, information exchanged between users of the communication session, or status updates relating to users engaging in the communication session and leaving the communication session.

Example User Interface

Figure 3C:
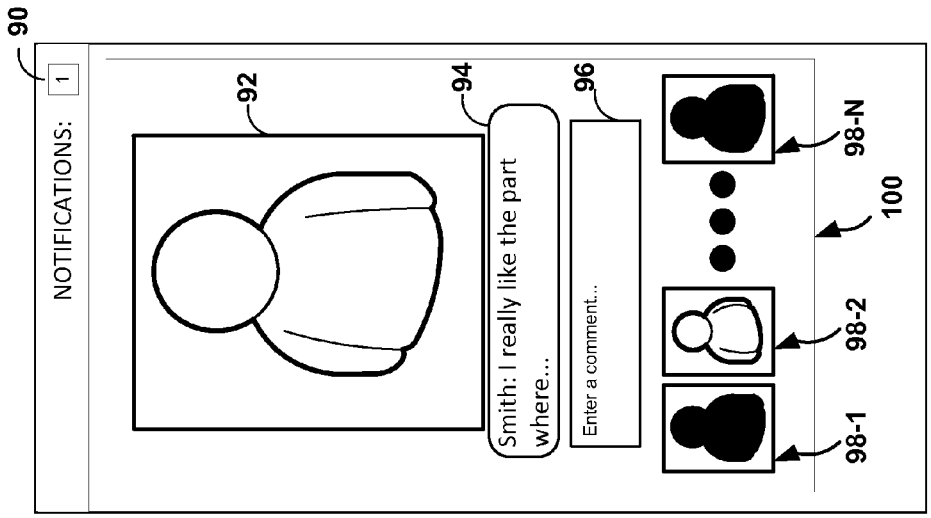
FIGS. 3A-3C are conceptual diagrams illustrating one example of a graphical display of a content item and an associated communication session application, in accordance with one or more aspects of the present disclosure.
Figure 3B:
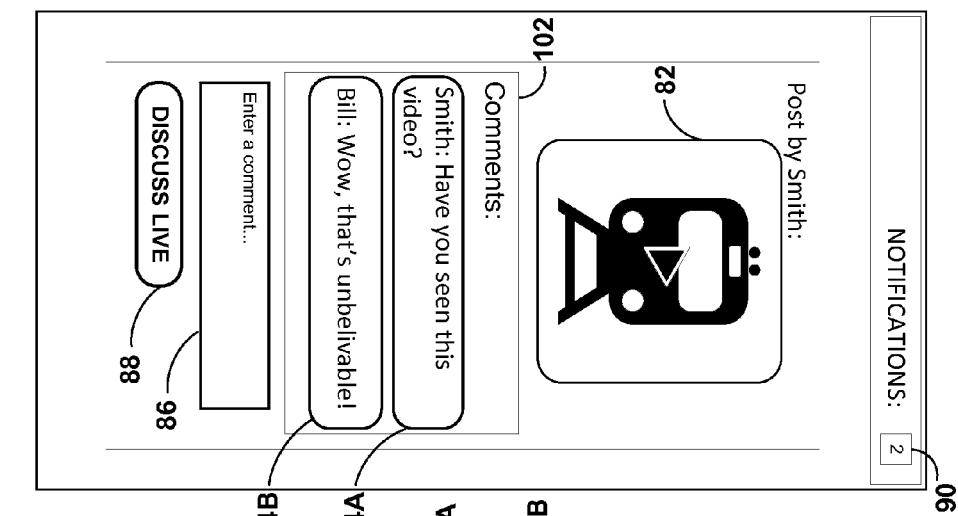
Figure 3A:
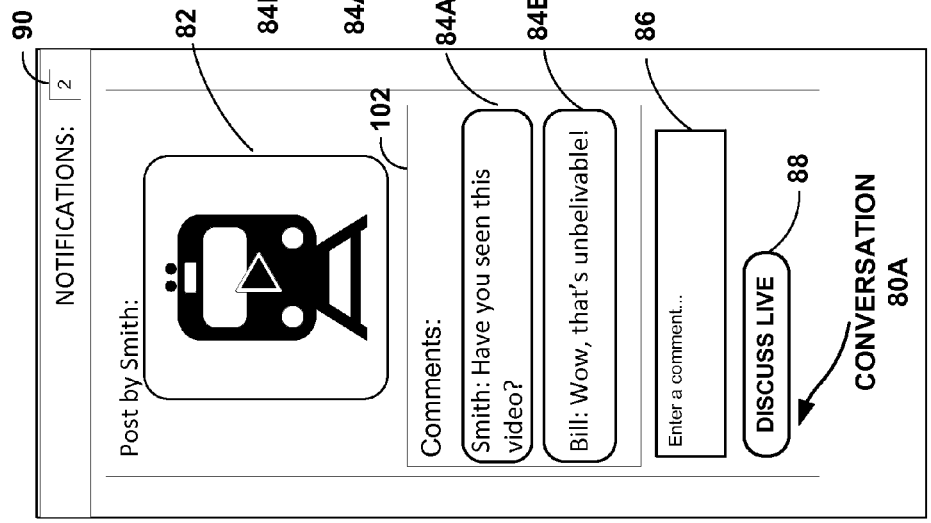

FIGS. 3A through 3C are conceptual diagrams illustrating one example of a graphical representation of a content item which may transition to a graphical representation of a communication session responsive to user input, in accordance with one or more aspects of the present disclosure. In the example of FIGS. 3A through 3C, three screenshots (collectively referred to as "screenshots 3") illustrate a transition displayed by a computing device, such as client device 10, from displaying a graphical representation 82 of a content item, to displaying a graphical representation of a communication session, such as communication session 34 of FIG. 1.

In FIG. 3A, a user, such as user 20 of FIG. 1, may have shared a content item, which may be represented with graphical representation 82. As shown in FIG. 3A, content item 82 may be a video and include a comment section 102. One or more users, such as users 38-1 and 38-2 may have utilized computing devices, such as client devices 40-1 and 40-2, to leave one or more comments 84A and 84B which may be part of a conversation 80A that may be associated with the content item of graphical representation 82. In the example FIG. 3A, user 20 may have shared content item 82 on a social network application and users 38-1 and 38-2 may have left comments 84A and 84B on the content item. One or more additional users may leave a comment similar to comments 84A and/or 84B by using a computing device to enter user input using a control, such as input control 86. At the point in time illustrated in FIG. 3A, a user may not have yet initiated or joined a communication session.

As illustrated in FIG. 3A, a user, such as user 38-N, may have received an invitation to a communication session, such as communication session 34 of FIG. 1. The invitation to communication session 34 may be one or more of an e-mail, an instant message, a notification displayed with the content item, and a notification in a text-based feed. In the example of FIG. 3A, client device 40-N may have received one or more notification 90 indicating that user 38-N has been invited to communication session 34. Notification 90 may be one of one or more invitations to one or more communication sessions. User 38-N may interact with notification 90 using an input device, such as input device 16 of client device 40-N. User 38-N may interact with notification 90, which may display a dropdown list or other menu, which may include one or more notifications, which may identify one or more communication sessions that user 38-N has been invited to. In some examples, the notification may also identify a context of the one or more communication sessions. User 38-N may use input device 16 of client device 40-N to select one or more communication sessions to join.

In response to user 38-N selecting a communication session to join, a client device, such as client device 40-N of user 38-N, may receive a signal from a communication server, such as communication server 32 of server device 30. The signal may cause client device 40-N to display one or more content items associated with the one or more selected communication sessions. Client device 40-N may display the graphical representations of the one or more content items, as illustrated in FIG. 3A. Further illustrated in FIG. 3A, computing device 40-N may display a graphical user interface component, such as a button 88, that user 38-N may interact with to initiate or join communication session 34.

In response to user 38-N interacting with button 88, client device 40-N may send a signal to communication sever 32 of server device 30 with a request indicating that client device 40-N wishes to join a communication session. Communication server 32 may determine a context for a topic of discussion for the communication session, which may be associated with content item 82. Communication server 32 may initiate communication session 34, and may connect client device 40-N to communication session 34.

FIGS. 3B and 3C are described herein in terms of continuing the example of FIG. 3A. As illustrated in FIG. 3B, in response to joining communication session 34, client device 40-N may display graphical representation 82 of the content item (for example, shown in FIG. 3A) that transitions to a graphical representation of the communication session shown as conversation window 100 (for example, shown in FIG. 3C). The transition from the graphical representation of the content item to the graphical representation of the communication session may appear to user 38-N as a rotation of a graphical representation of the content item by a selected angle. As an example, client device 40-N may rotate graphical representation 82 of the content item by three-hundred and sixty degrees or by any other angle. The rotation may be in a counterclockwise or clockwise direction. Client device 40-N may apply one or more other effects to simulate motion, such as a zooming effect or a motion blur effect. A motion blur effect may blur the contents of the rotating graphical representation to give the appearance of speed to the rotation. The transition may also include one or more effects, such as a "flip" effect, in which the graphical representation of the content item appears to flip or rotate end-over-end vertically, horizontally, or a combination of the two. During the flip, the content item may be presented from a three-dimensional perspective in order to give the appearance of depth to the graphical representation of the content item.

In the example illustrated in FIG. 3B, the graphical output from client device 40-N has been rotated by one-hundred eighty degrees. In other examples, the graphical output may rotate by a different amount, including an additional amount. Notification 90 is displayed at the bottom-left corner of the screen. Though not shown in FIG. 3, the transition from FIG. 3A to FIG. 3B may include displaying graphical representations of items, such as graphical representation 82 of the content item, comments 84, and button 88, and notifications 90, at one or more angles in between approximately zero and approximately one-hundred eighty degrees.

Client device 40-N may display a graphical representation of communication session 34. Client device 40-N may apply one or more effects that blend the display shown in FIG. 3A into the display of a communication session, illustrated in FIG. 3C. Such effects may include a morphing effect in which GUI items, such as graphical representation 82 of the content item, and comments 84, may change appearances over time to become the items in FIG. 3C. For example, client device 40-N may gradually change the appearance of graphical representation 82 of the content item so that it eventually changes into a graphical representation of a user 92.

Client device 40-N may display a graphical representation communication session 34, illustrated in FIG. 3C, once client device 40-N has joined communication session 34. While client device 40-N is engaged in communication session 34, client device 40-N may display a conversation window 100. Conversation window 100 may include one or more graphical representations of users presently engaged in communication session 34. The graphical representations of users may include graphical representation 92, as well as graphical representations 98-1 through 98-N (collectively referred to as "graphical representations 98"), where N is any nonnegative integer. Graphical representations 92 and 98 may correspond to one or more users 38, who are engaged in communication session 34.

Graphical representations 92 and 98 may be still images or videos. As one example, a still image graphical representation may be an icon or portrait of a user participating in communication session 34. In an example where a graphical representation is a video, the graphical representation may be a prerecorded video clip or a live video feed. A live video feed may be transmitted from a camera of the client device 40 which user 38-N is using to connect to communication session 34, if user 38-N has enabled the camera. As yet another example, a graphical representation may indicate the geographic location of a user, such as the location of the user on a map. As another example, a graphical representation may include information related to communication session 34, such as a length of time since one or more users have engaged in a previous communication session.

Additionally, graphical representations may change from still images to videos and vice versa. For example, graphical representation 98-1 may initially appear as a real-time video feed of a user. However, the user associated with graphical representation 98-1 may desire privacy, and may disable his or her video camera. The client device associated with graphical representation 98-1 may signal communication server 32 hosting communication session 34 that video has been disabled. Communication server 32 may signal one or more client devices of one or more users engaged in communication session 34 that graphical representation 98-1 no longer comprises a live video, and an output device 18 of client device 10 may display graphical representation 98-1 as a still image.

Graphical representation 92 may be of one of the users engaged in the communication session. Graphical representation 92 may be larger than graphical representations 98. Graphical representation 98 may be of a user who is currently communicating with the other users in the communication session. When a first user ceases actively participating, such as speaking or sharing a document, and a second user begins actively participating, graphical representation 92 may change to the graphical representation of the second user. As an example, user 38-1, who may be associated with graphical representation 98-1 in the communication session, may speak into an input device, such as a microphone, to welcome users 38 to the communication session. While user 38-1 is speaking, graphical representation 92 may comprise a larger version of graphical representation 98-1. When user 38-1 has finished speaking, another user may begin speaking, for instance user 38-2, who is associated with graphical representation 98-2, and graphical representation 48 may change to comprise a larger version of graphical representation 98-1.

In another example, user 20 may also be engaged in more than one communication session at the same time. Each communication session may be associated with an additional communication window, which may include the same or similar functionality to conversation window 100. When user 20 is engaged in more than one communication session, output device 18 may displaying multiple communication windows, each of which may include graphical representations of users engaged in the communication session. On devices having smaller displays where multiple graphical representations of communication sessions cannot be simultaneously displayed, a device, such as client device 40-N, may display only one communication window at a time. A user, such as user 38-N may switch between the multiple graphical representations of the communication sessions using a graphical user interface control, such as a scroll bar or other interface, that may display recent communications from each of the communication sessions, allowing user 38-N to select a communication session for client device 40-N to display based on the contents of that conversation.

While user 38-N is engaged in communication session 34, additional users may join the communication session in a similar manner to that illustrated in FIG. 3. That is, one or more additional users may interact with an invitation and join communication session 34. When a user attempts to join communication session 34, communication server 32 may send a signal to client devices 40 of one or more users who are engaged in communication session 34. The signal may cause client devices 40 to prompt the one or more users as to whether they would like to allow the one or more users who are attempting to join communication session 34. The users engaged in communication session 34 may thus deny users from joining communication session 34 based on a vote or another mechanism.

Users 38 engaged in communication session 34, represented graphically with conversation window 100, may communicate with one or more other users engaged in communication session 34 using at least one of text-based chat, audio-based communication, and video-based communication. Conversation window 100 may also include a number of graphically displayed features. These features may include graphical representations 92 of one or more participants in communication session 34. One such feature may be a chat input field 96, to which a user may input text-based communication data. Communication session 34 may also include a chat history 94. Chat history 94 may include one or more messages sent by one or more users engaged in communication session 34. As an example, chat feature 94 may include previous users' messages. Messages in the chat history may include one or more messages associated with the communication, such as messages 84. Messages 84 may also be associated with a content item, such as the content item depicted by graphical representation 82.

Client device 40-1 through 40-N may also display graphical representations 98-1 through 98-N that are associated with participants in the communication session. Graphical representations 26 may be of users who are currently participating in the communication session. Graphical representations 26 may be a combination of still image representations and video representations. For example, graphical representation 98-1 may be a video feed of that user, while graphical representation 98-2 may be a still image. Above, below, or adjacent to graphical representations 98, conversation window 100 may include usernames which identify the users associated with graphical representations 98. In one example, the usernames may comprise all or a portion of a person's actual name so that a user, such as user 38-N, can identify one or more other users 38 included in graphical representations 98. In another example, the usernames may be arbitrary and not related to a user's actual name.

Communication server 32 may also notify one or more users engaged in communication session 34 when one or more new users have joined or left communication session 34. As an example, when users 38-1 joins communication session 34, communication server 32 may signal client device 10, which may in turn signal output device 18. Output device 18 may notify user 20 that user 38-1 has joined communication session 34. When one or more users leave communication session 34, communication server 32 may signal one or more client devices, such as client device 10, that user 38-1 has left communication session 34. Client device 10 may signal one or more of output devices 18 to notify user 20 that user 38-1 has left communication session 34.

A user may resize, reposition, hide, or close conversation window 100. In some examples, user 20 may utilize input device 16 to interact with an edge of conversation window 100 and drag the edge of the window to reform the shape of conversation window 100 to a new set of dimensions. User 20 may also utilize an input device to interact with the edge of conversation window 100 and drag the window to a new position. If the new position is located at the edge of a screen, output device 18 may resize conversation window 100 to a different shape. In addition, graphical representations 98 may be displayed in a top-to-bottom fashion rather than a left-to-right fashion shown in FIG. 3. In such an example, user 20 may scroll through graphical representations 98 using navigation controls in a top-to-bottom order.

As another example, user 20 may utilize one or more input devices 16 to interact with a user interface control and to put live conversation window 100 in a hidden state. If conversation window 100 is in a hidden state, none or only a portion of the window may be visible. For example, output device 18 may not display graphical representations 98 or 92. When in a hidden state, user 20 may utilize input device 16 to interact with a graphical control, such as a virtual button to show conversation window 100. While in the hidden state, in some example, a notification may be outputted associated with conversation window 100. For example, client device 40-N may output a notification indicating that one or more users engaged in the communication associated with conversation window 100 has sent communication data.

An output device, such as output device 18 of client device 10, may display conversation window 100 along with the content item associated with the communication session of conversation window 100. In some examples, conversation window 100 may be illustrated as an overlay that is displayed in front of or atop a web page. Conversation window 100 may also be at least partially transparent or translucent. That is, a user may be able to view the contents of an underlying web page or other content, such as graphical representation 82 of the content item, that is behind conversation window 100. This transparency functionality may facilitate user interaction with the portion of the application behind conversation window 100.

Though displayed with graphical representation 82 of the content item, for the purposes of this example, conversation window 100 may be implemented in a variety of ways on a computing device. As examples, the functionality illustrated in FIG. 3 of transitioning from graphical representation of content item 82 to displaying conversation window 100 may be an extension to a web browser, a standalone application, or a component of a web page. A user may be able to download an application implementing the functionality illustrated in FIG. 3 from an application store or from a website to a computing device, such as a mobile device, and launch the application whenever the user wishes to find available users to communication with. In the case of a mobile application, once the application has been initially launched, the application may execute in a background state until the user switches to the application. While the application is executing in this background state, the computing device may reduce the power consumption of the application. A browser extension may be installed on the computing device to enable the functionality illustrated in FIG. 3. The extension could, for example, support the multi-way audio and/or visual communication of conversation window 100 as well as the graphical transition functionality of conversation window 100.

Example Method

Figure 4:
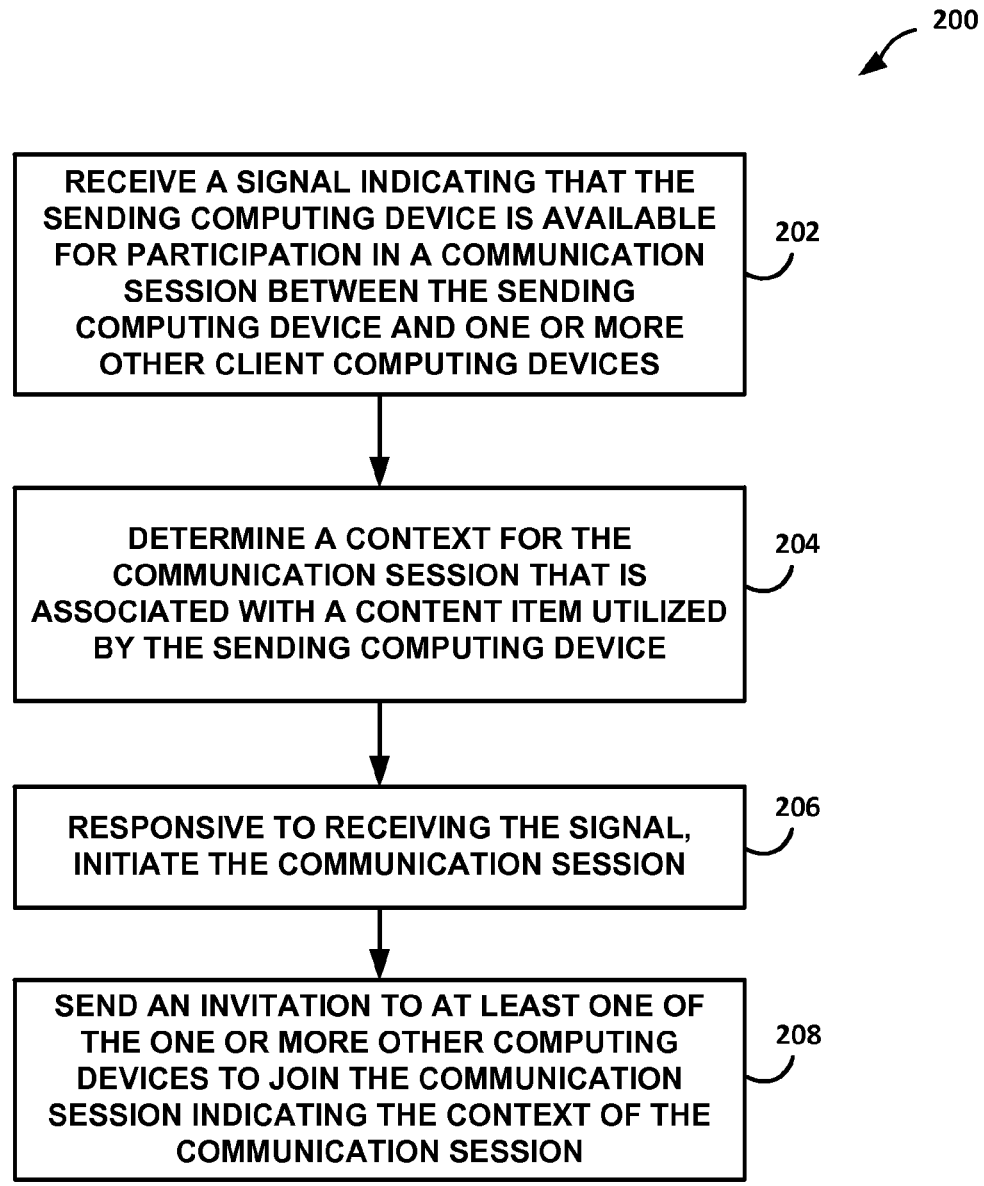
FIG. 4 is a flow chart illustrating an example method for determining a topic of conversation for a communication session based on a content item, in accordance with one or more aspects of the present disclosure.

FIG. 4 is a flow chart illustrating an example method 200 for determining a topic of conversation for a communication session based on a content item, in accordance with one or more aspects of the present disclosure. Method 200 may be performed by one or more computing devices, such as server device 30 or client devices 10 and 40-1 through 40-N of FIGS. 1 and 2. A communication session may be a video chat, an audio chat, and/or a live text-based chat, for example.

Method 200 may include receiving, by one or more computing devices, a signal from a first client computing device, wherein the signal indicates that the first client computing device is available for participation in a communication session that enables communication between the first client computing device and the one or more other client computing devices (202). Method 200 may also include determining a context for a topic of discussion for the communication session, wherein the context is associated with a content item utilized by the second computing device (204). Method 200 may further include, responsive to the receiving the signal, initiating, by the one or more computing devices, the communication session (206). Method 200 may further include sending, by the one or more computing devices, an invitation to at least one of the one or more other client computing devices to join the communication session, wherein the invitation indicates the context of the communication session (208).

As an example of method 200, communication server 32 of server device 30 of FIG. 1 may receive a signal from a client computing device, such as client device 10. The signal may indicate that client device 10 is available to engage in a communication session. Communication server 32 may determine a context for a topic of discussion for the communication session. The context may be associated with a content item utilized by client device 10. For example, the content item may be an audio file shared on a social network. Server device 30 may determine the context based on one or user more comments or other user interactions with the content item, such as users listening to the audio file. In response to receiving the signal, communication server 32 may initiate communication session 34 of FIG. 1. Communication server 32 may then send an invitation that includes the context of the communication session to one or more computing devices, such as client devices 40, to join communication session 34.

In an example of method 200, the first computing device, such as server device 30, may connect at least one other computing device, such as at least one of client devices 40 to communication session 34 in response to receiving a signal from the one or more other computing devices.

In another example of method 200, the first computing device, such as server device 30, may select which of the one or more other computing devices, such as client devices 40, to send the invitations based on the context of the communication session, such as communication session 34.

In another example of method 200, the first computing device, such as server device 30, may select which of the one or more other computing devices to send the invitation to based on the context of the communication session. Server device 30 may determine which of the one or more other client computing devices are associated with the content item. To determine which of the other client computing devices are associated with the content item, server device 30 may determine whether the one or more other computing devices have interacted with the content item, and/or whether the users of the one or more other client computing devices have a proximate geographic association with the content item. A proximate geographic association may be a distance between the content item and the one or more computing devices that is less than a specified threshold distance In order to determine whether the one or more other computing devices have interacted with the content item, server device 30 may determine whether the one or more users of the one or more other computing devices have been tagged in association with the content item. A user may be tagged in association with the content item if the user is associated with a piece of metadata that identifies the user. Metadata may include any piece of data that describes one or more aspects of an associated piece of data, such as a content item.

In another example of method 200, the content item may be at least one of a video, an electronic image, a hyperlink, an audio clip, a webpage, and a text-based conversation. In another example, a text-based based conversation, which may be similar to comments 84 of FIG. 3, may be associated with a video, blog post, article, and/or a social media post. In another example of method 200, one or more users of one or more computing devices, such as users 38 of client devices 40, may have participated in a text-based conversation.

In another example of method 200, the first computing device, such as server device 30, may further determine a context for a topic of discussion for the communication session, such as communication session 34, based on one or more tags associated with the content item, such as content item 82 of FIG. 3. The computing device may also examine a title of the content item, one or more words from the content item, a geographic location associated with the content item, as well as the author of the content item and/or the identity of one or more users who have commented on the content item to determine the context for the communication session. An identity of a user may be at least one of a username that may be known to a computing device, at least a portion of the actual name of a user, an e-mail address, and another unique identifier, such as a cell phone number.

In another example of method 200, the first computing device, such as server device 30, may receive a message from one or more other computing devices, such as client devices 40 of FIG. 1. The messaged received may request that the one or more other computing devices receive information exchanged in the communication session, such as communication session 34, which may be displayed along with a graphical representation of a content item, such as graphical representation 82 of FIG. 3, in real-time. In response to receiving the message, server device 30 may transmit the information exchanged in communication session 34 to the one or more client devices 40 in real-time. In response to receiving the information exchanged in communication session 34, the one or more other computing devices may output the information exchanged and the content item.

In another example of method 200, the first computing device, such as server device 30, may provide information, such as text-based chat, audio, transcription of audio, video, location data, and/or a file, exchange in the communication session, such as communication session 34, along with the content item after the communication session has completed.

In yet another example of method 200, the invitation to a communication session, such as communication session 34 may be one or more of a notification displayed in a status bar, an e-mail, an instant message, a notification displayed with the content item, such as content item 82, and/or a notification in a text-based feed. A status bar may be may be a graphical user interface component that stretches across a portion of window or a portion of an output device. The output bar may display alerts to notify a user when an event has occurred, such as the receipt of a new message, invitation to a communication session, or another notification.

The techniques described in this disclosure provide a first user the ability to more accurately determine one or more users who are available to engage in a communication session by having those users indicate their availability to engage in a communications session. Based on the availability by the one or more users, a computing device may display graphical representations of the one or more available users. The first user may select one or more of the graphical representations of the one or more available to users to invite the users associated with the one or more selected representations to a communication session, or to join a communication session that the one or more selected users are currently engaged in.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium encoded with instructions. Instructions embedded or encoded in an article of manufacture including an encoded computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, computer-readable storage media may comprise a tangible or non-transitory media. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. Aspects or features of examples described herein may be combined with any other aspect or feature described in another example. These and other embodiments are within the scope of the following claims.

What is claimed is:

1. A computer-implemented method, comprising:
providing, at a server computing device having one or more processors, a user interface to a first client computing device, the user interface including a digital content item capable of being output by the first client computing device;
receiving, at the server computing device, a signal from the first client computing device via the user interface to initiate a communication session regarding the digital content item;
responsive to receiving the signal, initiating, at the server computing device, the communication session, wherein the communication session enables communication between the first client computing device and one or more other client computing devices;
determining, by the server computing device, a context for a topic of discussion associated with the communication session based on the digital content item;
based on the context of the communication session, selecting, by the server computing device, a subset of the one or more other client computing devices to invite to participate in the communication session, wherein each one of the one or more other client computing devices is selected when its user is associated with the context of the communication session;
sending, by the server computing device, an invitation to each other client computing device of the subset of the one or more other client computing devices to join the communication session, wherein the invitation indicates the context of the communication session; and
responsive to receiving a response signal in response to the invitation from a particular other client computing device of the subset of the one or more other client computing devices, connecting the particular other client computing device to the communication session.

2. The computer-implemented method of claim 1, wherein selecting the subset of the one or more other client computing devices to invite to participate in the communication session comprises:
determining which of the one or more other client computing devices are associated with the digital content item; and
selecting the one or more other client computing devices are associated with the digital content item.

3. The computer-implemented method of claim 2, wherein determining which of the one or more other client computing devices are associated with the digital content item comprises:
determining whether the one or more other client computing devices have interacted with the digital content item;
determining whether one or more users associated with the one or more other client computing devices, respectively, have a proximate geographic association with the digital content item, wherein the proximate geographic association comprises a distance less than a threshold distance between a location associated with the digital content item and a location associated with the one or more other client computing devices;

determining whether the one or more users associated with the one or more other client computing devices have been tagged in association with the digital content item, wherein being tagged in association with the digital content item comprises one or more pieces of metadata that identify a user; and determining whether the one or more users of the one or more other client computing devices have specified an interest in a topic associated with the digital content item.

4. The computer-implemented method of claim 1, wherein the digital content item comprises at least one of a video, an image, an electronic file, a hyperlink, an audio clip, a webpage, and a text-based conversation.

5. The computer-implemented method of claim 4, wherein the text-based conversation is associated with at least one of a video, a blog post, an article, and a social media post.

6. The computer-implemented method of claim 1, wherein determining the context for the topic of discussion associated with the communication session based on the digital content item comprises:

determining the context for the topic of discussion based on at least one of: one or more tags associated with the digital content item, one or more keywords associated with the digital content item, a title of the digital content item, one or more words from the digital content item, a geographic location associated with the digital content item, an author of the digital content item, and an identity of one or more users who have commented on the digital content item, wherein a keyword comprises at least one of one or more words that frequently occur in the digital content item, a word or phrase describing the digital content item, and an alphanumeric combination describing the digital content item, and wherein a tag comprises a keyword that is determined by a creator of the digital content item or a user that interacts with the digital content item.

7. The computer-implemented method of claim 1, further comprising:

receiving a message from the particular other client computing device, wherein the message requests that the particular other client computing device receive information exchanged in the communication session; and responsive to receiving the message, transmitting the information exchanged in the communication session along with the digital content item to the particular other client computing device, wherein the information exchanged comprises at least one of text-based chat, audio, a transcription of audio, video, location data, and a file.

8. The computer-implemented method of claim 1, further comprising:

transmitting, from the server computing device, information exchanged in the communication session to the first client computing device after the communication session is completed, wherein the information exchanged comprises at least one of text-based chat, audio, a transcription of audio, video, location data, and a file.

9. The computer-implemented method of claim 1, wherein sending the invitation comprises sending a notification signal while the communication session is in progress, the notification signal indicating that the communication session is in progress and may be joined, wherein receipt of the notification signal causes each of the subset of the one or more other client computing devices to display a touch-target notification associated with the digital content item that, when selected, causes each of the subset of the one or more other client computing devices to join the communication session.

10. The computer-implemented method of claim 1, wherein the invitation comprises at least one of a notification displayed in a status bar, an e-mail, an instant message, a notification displayed with the digital content item, and a notification in a text-based feed.

11. The computer-implemented method of claim 1, further comprising:

receiving, by the server computing device, a user input that specifies the context for the communication session from the first client computing device, wherein determining the context for the topic of discussion associated with the communication session is further based on the user input.

12. A non-transitory computer-readable medium comprising instructions that, when executed by one or more processors, causes the one or more processors to perform operations comprising:

Providing a user interface to a first client computing device, the user interface including a digital content item capable of being output by the first client computing device;

receiving a signal from the first client computing device via the user interface to initiate a communication session regarding the digital content item;

responsive to receiving the signal, initiating the communication session, wherein the communication session enables communication between the first client computing device and one or more other client computing devices;

determining a context for a topic of discussion associated with the communication session based on the digital content item;

based on the context of the communication session, selecting a subset of the one or more other client computing devices to invite to participate in the communication session, wherein each one of the one or more other client computing devices is selected when its user is associated with the context of the communication session;

sending an invitation to each other client computing device of the subset of the one or more other client computing devices to join the communication session, wherein the invitation indicates the context of the communication session; and responsive to receiving a response signal in response to the invitation from a particular other client computing device of the subset of the one or more other client computing devices, connecting the particular other client computing device to the communication session.

13. The non-transitory computer-readable medium of claim 12, wherein selecting the subset of the one or more other client computing devices to invite to participate in the communication session comprises:

determining which of the one or more other client computing devices are associated with the digital content item; and selecting the one or more other client computing devices are associated with the digital content item.

14. The non-transitory computer-readable medium of claim 13, wherein determining which of the one or more other client computing devices are associated with the digital content item comprises:

determining whether the one or more other client computing devices have interacted with the digital content item;

determining whether one or more users associated with the one or more other client computing devices, respectively, have a proximate geographic association with the digital content item, wherein the proximate geographic association comprises a distance less than a threshold distance between a location associated with the digital content item and a location associated with the one or more other client computing devices;

determining whether the one or more users associated with the one or more other client computing devices have been tagged in association with the digital content item, wherein being tagged in association with the digital content item comprises one or more pieces of metadata that identify a user; and determining whether the one or more users of the one or more other client computing devices have specified an interest in a topic associated with the digital content item.

15. The non-transitory computer-readable medium of claim 12, wherein the digital content item comprises at least one of a video, an image, an electronic file, a hyperlink, an audio clip, a webpage, and a text-based conversation.

16. The non-transitory computer-readable medium of claim 15, wherein the text-based conversation is associated with at least one of a video, a blog post, an article, and a social media post.

17. The non-transitory computer-readable medium of claim 12, wherein determining the context for the topic of discussion associated with the communication session based on the digital content item comprises:

determining the context for the topic of discussion based on at least one of: one or more tags associated with the digital content item, one or more keywords associated with the digital content item, a title of the digital content item, one or more words from the digital content item, a geographic location associated with the digital content item, an author of the digital content item, and an identity of one or more users who have commented on the digital content item, wherein a keyword comprises at least one of one or more words that frequently occur in the digital content item, a word or phrase describing the digital content item, and an alphanumeric combination describing the digital content item, and wherein a tag comprises a keyword that is determined by a creator of the digital content item or a user that interacts with the digital content item.

18. The non-transitory computer-readable medium of claim 12, further comprising:

receiving a message from the particular other client computing device, wherein the message requests that the particular other client computing device receive information exchanged in the communication session; and responsive to receiving the message, transmitting the information exchanged in the communication session along with the digital content item to the particular other client computing device, wherein the information exchanged comprises at least one of text-based chat, audio, a transcription of audio, video, location data, and a file.

19. The non-transitory computer-readable medium of claim 12, further comprising:

transmitting, from the server computing device, information exchanged in the communication session to the first client computing device after the communication session is completed, wherein the information exchanged comprises at least one of text-based chat, audio, a transcription of audio, video, location data, and a file.

20. The non-transitory computer-readable medium of claim 12, wherein sending the invitation comprises sending a notification signal while the communication session is in progress, the notification signal indicating that the communication session is in progress and may be joined, wherein receipt of the notification signal causes each of the subset of the one or more other client computing devices to display a touch-target notification associated with the digital content item that, when selected, causes each of the subset of the one or more other client computing devices to join the communication session.

21. The non-transitory computer-readable medium of claim 12, wherein the invitation comprises at least one of a notification displayed in a status bar, an e-mail, an instant message, a notification displayed with the digital content item, and a notification in a text-based feed.

22. The non-transitory computer-readable medium of claim 12, further comprising:

receiving a user input that specifies the context for the communication session from the first client computing device, wherein determining the context for the topic of discussion associated with the communication session is further based on the user input.

23. A computer-implemented method, comprising:

receiving, at a server computing device having one or more processors, a signal from a first client computing device to initiate a communication session, the signal identifying a digital content item being output at the first client computing device;

responsive to receiving the signal, initiating, at the server computing device, the communication session, wherein the communication session enables communication between the first client computing device and one or more other client computing devices;

determining, by the server computing device, a context for a topic of discussion associated with the communication session based on the digital content item;

based on the context of the communication session, selecting, by the server computing device, a subset of the one or more other client computing devices to invite to participate in the communication session, wherein each one of the one or more other client computing devices is selected when its user has interacted with the digital content item;

sending, by the server computing device, an invitation to each other client computing device of the subset of the one or more other client computing devices to join the communication session, wherein the invitation identifies the context;

receiving, at the server computing device, a response signal from a particular other client computing device of the subset of the one or more other client computing devices, the response signal indicating that the particular other client computing device desires to join the communication session;

responsive to receiving the response signal, sending, by the server computing device and to the first client computing device, a notification that the particular other client computing device desires to join the communication session;

responsive to receiving an approval of the particular other client computing device from the first client computing device, connecting, at the server computing device, the particular other client computing device to the communication session.

24. The computer-implemented method of claim 23, wherein interaction with the digital content item comprises at least one of:
   displaying the digital content item;
   playing the digital content item;
   providing a comment upon the digital content item; and
   being tagged in association with the digital content item.

25. The computer-implemented method of claim 23, wherein the digital content item comprises at least one of a video, an image, an electronic file, a hyperlink, an audio clip, a webpage, and a text-based conversation.

* * * * *